United States Patent [19]

Miller et al.

[11] 3,899,782
[45] Aug. 12, 1975

[54] APPARATUS FOR MONITORING REACTION END POINT

[76] Inventors: Everett L. Miller, 339 W. Burnham St., Battle Creek, Mich. 49015; Frank D. Miller, 609 Warwick Ave., Thousand Oaks, Calif. 91360

[22] Filed: Aug. 27, 1973

[21] Appl. No.: 391,672

[52] U.S. Cl............ 340/228 R; 73/342; 340/213 Q; 307/117
[51] Int. Cl. .......................................... G08b 25/00
[58] Field of Search....... 340/228 R, 213 Q; 73/342, 73/362 R; 307/117

[56] References Cited
UNITED STATES PATENTS

| | | | |
|---|---|---|---|
| 2,799,851 | 7/1957 | Moore............................ | 340/228 R |
| 2,890,429 | 6/1959 | Baker............................. | 73/362 R |
| 3,334,814 | 8/1967 | Bray et al...................... | 73/362 AR |
| 3,548,396 | 12/1970 | Roberts.......................... | 340/228 |
| 3,587,317 | 6/1971 | Ruof............................... | 73/342 |

*Primary Examiner*—Glen R. Swann, III
*Attorney, Agent, or Firm*—Samuel Kurlandsky

[57] ABSTRACT

An apparatus for monitoring the course of a reaction under elevated temperature conditions as determined by the temperature of the reaction mixture, and particularly as applied to the processes of rendering meatscrap and bone, used kitchen greases and edible meat products, candy making, and similar industrial applications, comprises a kettle having means for heating, and means for monitoring the process to determine when the proper end point has been reached. The monitoring means comprises a solid state temperature sensing device positioned in the kettle to sense the temperature of the reaction mixture, electrical wire leads having high temperature insulation connecting the solid state device to a remote junction box, and a control box having an electronic circuit for amplifying the electrical signal current passing through the temperature sensing device, a milliammeter for displaying the temperature visually, and a relay energized through a silicon controlled rectifier for sounding audible and/or visual alarms when an end point has been reached. The temperature sensing device is connected in series with a variable resistor having a graduated scale and with a calibrating resistor so that a plurality of reaction kettles may be monitored and controlled by setting calibrated controls in the apparatus which has only a single alarm relay.

5 Claims, 6 Drawing Figures

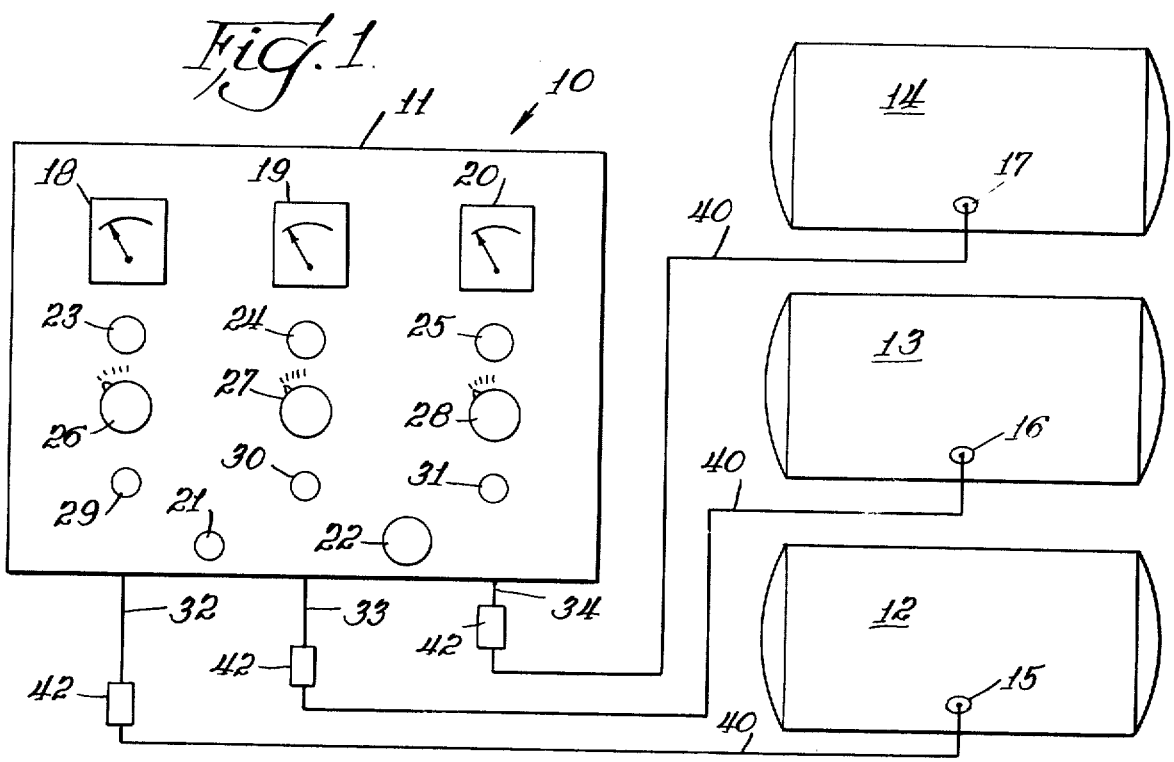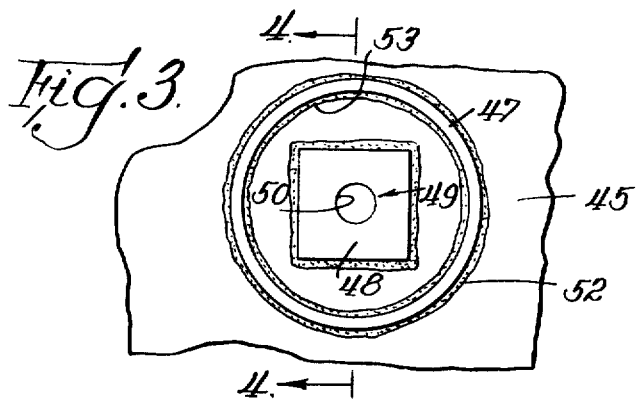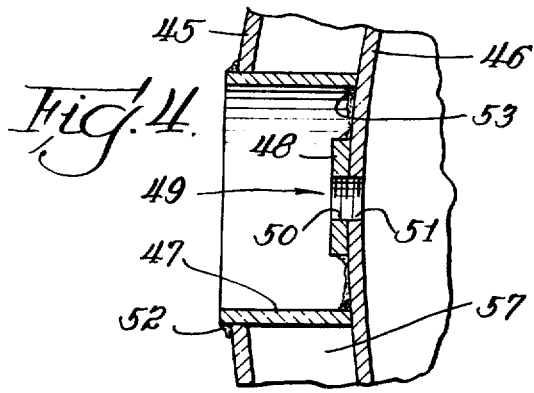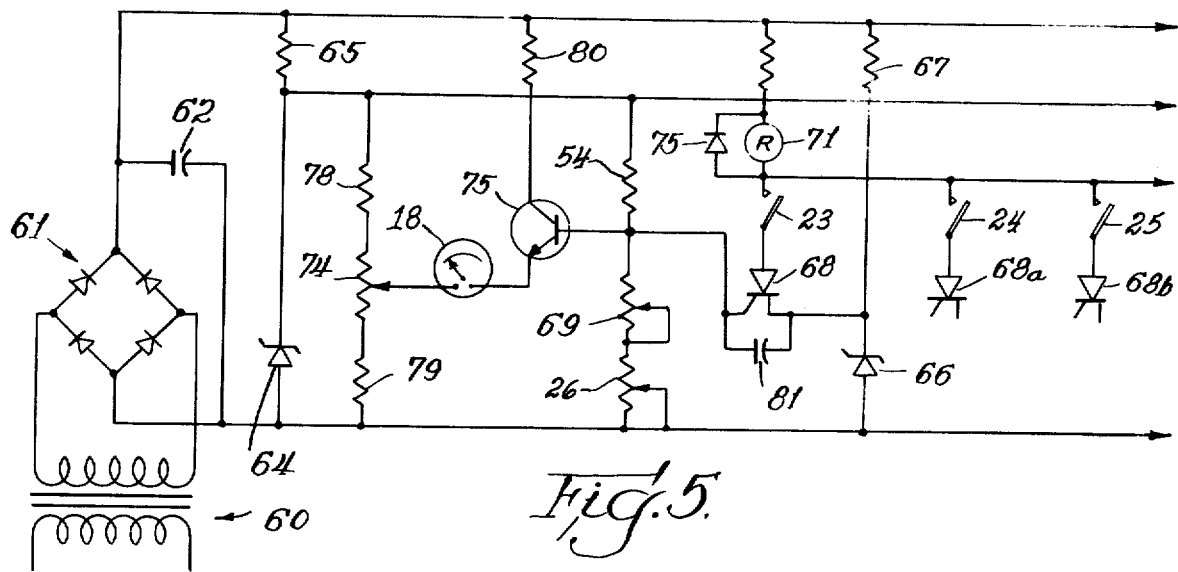

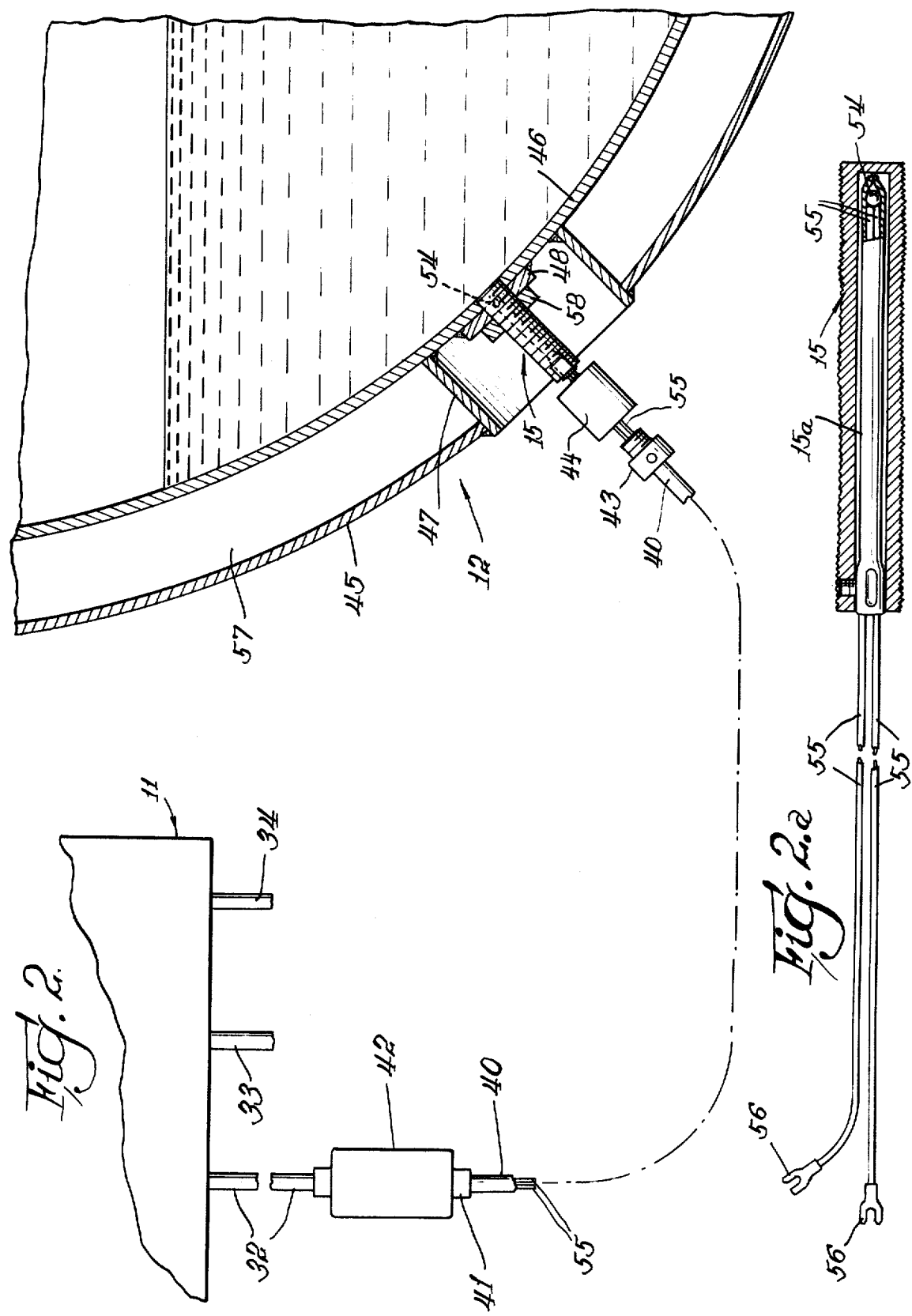

3,899,782

APPARATUS FOR MONITORING REACTION END POINT

BACKGROUND OF THE INVENTION

The present invention relates to apparatus for monitoring the course of a reaction carried out at elevated temperature, and is more particularly concerned with an apparatus for monitoring the process of rendering meat-scrap carried out in a plurality of kettles to determine when the proper end point of each has been reached.

The rendering of meat-scrap has become an important industry, and may become even more important with world-wide shortages of high protein-containing food products. In carrying out the process, meat-scrap, bones, grease, and even dead stock, are placed in a steam-heated cooker or kettle which has a jacket on the outside and revolving paddles on the inside to agitate the mixture. In the early part of the process there is a large amount of water in the mixture and the temperature of the reactants remains no greater than 212° F., or the boiling point of water. After most of the water has been driven off, the temperature of the reaction ingredients begins to rise until a temperature is reached in the vicinity of 265° F. At this point the desired end point has been reached and it is desirable to discharge the mixture. If the temperature of the mixture is permitted to become too great, the tallows in the cooker will be scorched and become brown, thereby reducing the resale value. If the mixture has not been heated sufficiently, the material will be slippery when it is discharged from the cooker, and will not press well when it is desired to press the fat from the meat-scrap. Additionally, an economic factor dictates attainment of the proper end point, since if a sufficiently high reaction temperature has not been attained, much of the fat will be left in the meat-scrap, and the material can only be sold as meat-scrap of a reduced protein content. If the meat-scrap does not have at least 50 per cent or more of protein, then the manufacturer is penalized because of the reduced protein content. By removing the batch at the right temperature it is possible to remove most of the fat or sufficient part of the fat from the meat-scrap so that the meat-scrap has the proper protein content, and the tallow resulting is not burned or discolored.

Apparatus for monitoring the rendering process has been disclosed in the prior art. Such apparatus has a heat sensing probe inserted into the reaction kettle and a junction box mounted on the side of the kettle and directly connected to the probe. A separate electronic control assembly is then used for each kettle which amplifies the signal from the sensing device and actuates signals when the desired end point has been reached as evidenced by the proper temperature of the reaction mixture.

Although prior art devices have been satisfactory, separate monitoring devices have been required for each kettle in a multi-kettle establishment where two or more kettles may run simultaneously. Moreover, such devices have not provided means for calibration of the controls so that the same settings of all controls could be used to get the same end point for each kettle. Prior art devices have also been subject to the drawback that the junction boxes are mounted on the side of the kettles and are therefore subjected to high temperatures from the kettles and deteriorate rapidly.

OBJECTS OF THE INVENTION

It is accordingly an object of the present invention to provide a monitoring apparatus for use in controlling the reaction and determining the end point in elevated temperature processes.

It is an additional object to provide such an apparatus particularly adapted for use in processes wherein meat-scrap and bones are rendered to produce high protein content by-products.

It is a further object to provide a monitoring device of the type described which exclusively utilizes solid state electronic devices.

It is still further an object to provide a monitoring device of the type described in which the desired end points in a plurality of kettles can be precisely established by graduated controls in a control sub-assembly and wherein the plurality of graduated controls may be calibrated with respect to each other so that when identical settings of the controls are used for each kettle, the end points will be the same.

It is another object to provide a monitoring device of the type described wherein a single detecting and end point alarm actuating device may be utilized for simultaneously controlling a plurality of kettles.

It is still another object to provide a monitoring apparatus wherein the sensing device is provided with long heat-resistant leads which are not susceptible to damage by high temperatures, and which may be connected to a junction box at a remote position from the kettle.

It is still another object to provide a monitoring device which may be readily assembled by modern printed circuit techniques and which is relatively inexpensive to manufacture.

Still other objects will readily present themselves to one skilled in the art upon reference to the ensuing specification, the drawings, and the claims.

According to the invention, a monitoring apparatus is provided for monitoring the temperature of the reaction mixture in a kettle utilized in processes such as in rendering meat-scrap, bones, and other animal products, which apparatus is provided with controls for indicating the end point of the process including a calibrating control, and which set of controls may be utilized to monitor a plurality of rendering kettles. After the controls have been calibrated with each other by use of the calibrating control, the same end point for each kettle may be obtained by setting each control to the same dial reading. Additionally, a remote lead-in to the temperature sensing device in the kettle is provided having insulation able to withstand high temperature.

BRIEF DESCRIPTION OF THE DRAWINGS

In the drawings,

FIG. 1 is a diagrammatic view of the apparatus according to the invention.

FIG. 2 is a fragmentary view showing a portion of the lead-in, sensing probe and kettle wall.

FIG. 2a is an elevational view partially in cross-section of the tube containing the thermistor and the lead-in wires.

FIG. 3 is a fragmentary elevational view showing the structure of the kettle wall adapted to receive the probe.

FIG. 4 is a fragmentary cross-sectional view taken at the line 4—4 of FIG. 3, looking in the direction of the arrows, and FIG. 5 is a schematic diagram of the electronic circuit of the apparatus.

DESCRIPTION OF THE PREFERRED EMBODIMENT

Referring to FIG. 1, the apparatus of the present invention 10 is shown in diagrammatic form and comprises a cabinet 11 housing an electronic control module and manual controls. The apparatus is connected to reaction kettles 12, 13, and 14 which have temperature sensing probes 15, 16, and 17, respectively, connected therein by electrical leads 32, 33, and 34, respectively. Mounted on the front panel of the cabinet 11 are 0–1 milliammeters 18, 19 and 20 serving as indicators for the kettles 12, 13, and 14, respectively. A power switch 21 is utilized to turn on the entire electrical circuit of the apparatus, the power being fused by a fuse assembly 22. Alarm switches 23, 24, and 25 are utilized to turn on the alarm circuits for the kettles 12, 13, and 14, respectively. Three 1000 ohm, 10 turn potentiometer graduated control dials 26, 27, and 28, are utilized to control the end point alarm for the three kettles. Pilot lamps 29, 30, and 31 are utilized as visual indicators that the alarm switches are or or off.

Referring to FIG. 2, means for connecting a sensor probe 15 with the electronic monitor apparatus is shown comprising a Greenfield-type conduit 40 having a connector 41 for connecting to a junction box 42 which in turn is connected to the rear of the cabinet 11 containing the electronic equipment. At the other end, the conduit 40 has a connector 43 with a threaded end for connecting to an internally threaded conduit coupling 44, which in turn is adapted to be connected to the probe 15 which is threaded over its entire length.

Referring to FIGS. 2a, 3 and 4, the structure is shown in detail and comprises a kettle 12 which has a steam jacket formed by an outer wall 45 and an inner wall 46. The outer wall has a circular aperture provided therein in which is positioned a tubular collar 47 having in a particular installation a 6-inch diameter and a length of about 3¼ inch. The collar 47 is welded to both the outer wall 45 and the inner wall 46 at welds 52 and 53. Intermediate the outer wall 45 and inner wall 46 is a steam chamber 57. A steel plate 48 is welded to the inner wall 46. An aperture 49 is provided through the plate 48 and through the inner wall 46, the axial walls of the aperture 49 being provided with threads 50 in the plate 48 and threads 51 in the inner wall 46. The probe 15 comprising a ¾-inch copper or aluminum tube about 3⅝ inch long and having a closed end is threadedly engaged in the threaded aperture 49 with the end of the tube substantially flush with the inner surface of the inner wall 46. A lock nut 58 (FIG. 2) maintains the probe 15 in position. Positioned in the channel of the probe 15 is a copper tube 15a closed at one end having inserted therein near the closed end a thermistor 54 rated at 20 K ohms at 25° C. The thermistor is connected by Teflon insulated leads 55 to terminals 56 which are in turn connected to a terminal strip in the junction box 42 (FIGS. 2 and 2a).

Referring to FIG. 5 a schematic diagram of the electrical circuit of the monitoring device is shown, and comprises a D.C. power supply including a 115 volt-60 Hz. transformer 60 which steps the line voltage down to 25 volts. The alternating current is converted to D.C. by a full wave rectifier bridge 81 formed of four 1N4001 silicon diodes, and a 100 MFD capacitor 62, producing approximately 33 volts across the capacitor 62. A 6.8 volt Zener diode 64 and a 160 ohm resistor 65 provide 6.8 volts of regulated current at their junction which is applied to the metering and measuring circuit module. A 2.4 volt Zener diode 66 and a 2000 ohm resistor 67 provide 2.4 volts bias to a silicon controlled rectifier 68. The thermistor 54, a 500 ohm trim potentiometer 69 and a 1000 ohm, 10 turn potentiometer 26 form a voltage divider across the 6.8 volt buses. The potentiometer 69 serves as a calibration potentiometer and is adjusted from the rear of the apparatus by a screwdriver. The potentiometer 26 is connected to the graduated dial 28. With the gate of the silicon controlled rectifier 68 tied to the junction of the thermistor 54 and the potentiometers 69 and 26, as shown, and with the cathode of the silicon controlled rectifier 68 held at 2.4 volts, application of heat to the thermistor 54, which thermistor has a negative resistance characteristic, results in the gate of the silicon controlled rectifier 68 gradually becoming more positive. As the potential at the gate becomes more positive than the cathode, electrons flow through the silicon controlled rectifier 68, cathode to gate, and when this flow reaches a sufficient predetermined magnitude, the silicon controlled rectifier 68 breaks down to the conducting condition, energizing a 24 volt D.C. relay 71 through the switch 23 which is in closed condition during operation. The thermistor 54 has approximately 20,000 ohm resistance at 70° F., and the resistance is reduced to approximately 800 ohms at 265° F. The relay 71 has normally open contacts which apply 115 volt 60 Hz. current to a horn or other alarm device when closed. As the silicon controlled rectifier triggers to its on condition, the potential at its gate increases and the meter "pins" or goes to full scale indicating that the silicon controlled rectifier has fired. When the 100 ohm trim potentiometer 74 is properly adjusted, a 2N2222 transistor 75 begins to conduct as its base (the gate of the silicon controlled rectifier) becomes positive. As a result, the meter 18 gives an early indication that the process is approaching its end point. The potentiometer 74 is so adjusted that the meter reads 80 on its 0–100 scale just as the silicon controlled rectifier fires. The potentiometer 26 which is a 10 turn potentiometer, panel mounted with a dial 26 graduated 0–999 controls the temperature at which the silicon controlled rectifier 68 fires. Turning the potentiometer 26 in one direction reduces its net resistance, and vice versa. Consequently, turning the potentiometer 26 in one direction at the same time increases the temperature required to be attained by the thermistor 54 to raise the potential sufficiently above the cathode of the silicon controlled rectifier 68 to cause it to fire. In practice, the potentiometer 69 is set at the middle of its range at the beginning of the calibration procedure and the potentiometer 26 is set at a value which will just allow the silicon controlled rectifier 68 to fire as the batch reaches the end point. The potentiometer 74 is set to provide a reading arbitrarily of 0.80 ma. on the meter 18 just previous to the firing of the silicon controlled rectifier. Where two or more units are incorporated to be monitored by the single instrument, the second and succeeding units are calibrated in similar manner.

In FIG. 5, there are additionally shown silicon controlled rectifiers 68a and 68b, and switches 24 and 25 utilized to control the kettles 13 and 14. In addition to the silicon controlled rectifiers and switches, each circuit contains its own meter, thermistor, potentiometers, and associated components, feeding into the common relay 71, and powered by the common power supply shown in the drawing.

Since all units do not fire on the same dial reading of the potentiometer 26 due to variations in the tolerances of the components used, etc., a correction is made by the calibrating potentiometer 69. After the controls for one cooker or kettle are set up as a standard, the potentiometer 69 of each circuit is turned to add or subtract resistance to the particular circuit so that the silicon controlled rectifier wall trigger at the same dial reading of the potentiometer 26 as the standard. Subsequently, the end point can be set for each kettle by utilizing the same setting of the potentiometer 26 for each kettle. A 1N4001 silicon diode 75 is utilized to suppress the transient voltage produced when the switch 23 is opened to silence the alarm. A 220 ohm resistor 78 and a 100 ohm resistor 79 cooperate with the potentiometer 74 to provide the proper range voltage to be applied to the meter 18. A 15 K ohm dropping resistor 80 is connected in series with the collector of the transistor 75 to provide the proper voltage. A 470 ohm dropping resistor is connected to the relay 71 to provide the proper operating voltage. A 25 MFD capacitor 81 prevents a transient from triggering the silicon controlled rectifier.

The monitoring apparatus of the present invention is set up and calibrated as follows. First, a batch of meat-scrap to be rendered is placed in one of the kettles, as for example kettle 12. The dial 20 of the 10 turn potentiometer is then set at about 900, and the other potentiometers are placed approximately at their mid range. With all the alarm switches in the off position the main power switch is turned on. The batch in the kettle is permitted to cook. When the batch is judged to be complete, the meter 18 is set at approximately 0.80 ma. with the meter adjustment control 74. Steam is turned off from the kettle and the calibration procedure is then continued as rapidly as possible to prevent the cooker contents from continuing beyond the end point by the heat stored in the cooker walls. The 10 turn dial 26 is then turned to 950 and the alarm switch 23 turned on. The dial 26 is slowly turned counterclockwise until the relay 71 is closed and the alarm sounds. The alarm is then switched off. The latter two steps are repeated and the meter reading noted at the instant just before the alarm sounds. With the alarm switch off, the meter is set upscale or downscale with the meter adjustment control 74 until when the alarm sounds the meter reads approximately 80. The first kettle's monitor is now in calibration and setting the dial 26 at the number at which the alarm sounded and with the alarm switch on, another batch is processed to note the meter reading as the alarm sounds. It should be approximately 80. If necessary, the meter adjustment control must be re-adjusted for the correction. The batch is further examined to determine whether or not it is properly processed. To compensate, turning the dial 26 a few divisions in one direction will lengthen the cooking cycle and counterclockwise will shorten the cooking cycle. The same steps are now repeated for the kettles 13 and 14. Generally, the readings on dials 27 and 28 are not the same as on dial 26 when the proper end point has been obtained. In order to make the dials read the same, each dial is set at the same reading as that of the dial 26 at the end point, and the calibrating process carried out as above, compensating each circuit with the compensating potentiometer. With all the kettles sounding the alarm at the same number of the dials 26, 27, and 28, and with all the meters reading 80 as the alarm sounds, the monitoring equipment is now in calibration and ready to be put into service.

It has been found that at the desired end point, the temperature at the probe should be approximately 265° F. Although this is not in fact a true measurement of the temperature of the material being cooked since the probe is slightly affected by the temperature of the steam in the outer jacket of the cooker, utilization of this temperature at the probe provides a precise end point for the reaction, although the actual temperature of the batch may be in the range of 250°–225° F.

The steam pressure utilized to heat the kettles is generally regulated. This is desirable because the raw steam pressures available in various plants may vary from 65 to 100 pounds per square inch.

The present invention has several advantages over prior art devices. The primary advantage is that the addition of a compensating potentiometer in series with the main graduated potentiometer provides a means for calibrating the point of the graduated potentiometer at which the end point alarm sounds. When the monitoring instrument is used for simultaneous control of a plurality of kettles, this permits the same dial setting of the graduated potentiometer to be used for all the kettles, and the end point at which the alarm sounds will be the same for each kettle. If it should turn out that the material has not been reacted sufficiently, the dial setting for all the kettles can be changed by rotating the dial clockwise or counterclockwise, and each kettle will experience the same change and the same difference in end point. The use of meters for each kettle control when properly calibrated as described above, gives a visual indication of which kettle has reached the end point when the alarm sounds, thereby permitting only a single relay and alarm system to be used for all the kettles. Additionally, the junction box is placed remotely from the probe and a Teflon insulated line is utilized from the probe to the junction box, which is not affected by the heat given off by the kettle.

With the present apparatus it is possible to use a single relay for all the kettles, and where proper individual indicators are utilized, only one relay need be utilized. However, it is preferred to use a one milliammeter for each kettle.

It is to be understood that the invention is not to be limimted to the exact details of operation or structure shown and described, as obvious modifications and equivalents will be apparent to one skilled in the art.

We claim:

1. An apparatus for monitoring the course of a reaction carried out by heating reaction mixtures in a plurality of reaction kettles and sensing the attainment of a particular temperature by the reaction mixture in each kettle as indicative of a desired end point, said apparatus comprising:
   1. means providing a direct current power supply,
   2. an alarm circuit connected to said direct current comprising a common relay for all said kettles having alarm means connected to the contact points thereof,
   3. a silicon controlled rectifier connected to the coil of said relay,
   4. a probe mounted on the wall of each kettle 5. end point control means for each kettle connected across said direct current power supply comprising in series:
   a. a potentiometer having a graduated scale on its dial,
   b. a calibrating potentiometer, and
   c. a solid state thermoresistive temperature sensing device mounted in the end of each of said probes, the junction between each of said temperature sensing devices and the corresponding one of said potentiometers for each kettle being connected to the gate of said silicon controlled rectifier, whereby the calibrating potentiometer for each kettle may be adjusted so that the readings on the graduated scale potentiometers for each kettle are the same when the same end point is reached by the reaction mixture in each kettle.

2. An apparatus according to claim 1, wherein a milliammeter is provided for each kettle connected to monitor said thermoresistive temperature sensing device, thereby providing an indication of which kettle has reached the end point when the common alarm sounds.

3. An apparatus according to claim 1, wherein said temperature sensing device is connected to a remote junction box by a tetrafluoroethlene resin insulated electrical line.

4. An Apparatus according to claim 1, wherein a Zener diode is provided across the terminals of said power supply to provide voltage regulation.

5. An apparatus according to claim 1, wherein said potentiometer having a graduated scale on its dial is a 10-turn potentiometer.

* * * * *